(12) United States Patent
Green

(10) Patent No.: US 9,314,972 B2
(45) Date of Patent: Apr. 19, 2016

(54) APPARATUS FOR ADDITIVE LAYER MANUFACTURING OF AN ARTICLE

(71) Applicant: Gordon R Green, Bristol (GB)

(72) Inventor: Gordon R Green, Bristol (GB)

(73) Assignee: Materials Solutions, Worcester (GB)

( * ) Notice: Subject to any disclaimer, the term of this patent is extended or adjusted under 35 U.S.C. 154(b) by 369 days.

(21) Appl. No.: 13/828,281

(22) Filed: Mar. 14, 2013

(65) Prior Publication Data

US 2013/0270750 A1 Oct. 17, 2013

Related U.S. Application Data

(60) Provisional application No. 61/622,050, filed on Apr. 10, 2012.

(30) Foreign Application Priority Data

Mar. 29, 2012 (GB) .................................. 1205591.9

(51) Int. Cl.
   *B29C 35/08* (2006.01)
   *B29C 67/00* (2006.01)
   *B22F 3/105* (2006.01)

(52) U.S. Cl.
   CPC ........... *B29C 67/0077* (2013.01); *B22F 3/1055* (2013.01); *B29C 67/0085* (2013.01); *B29C 67/0088* (2013.01); *B22F 2003/1056* (2013.01); *B22F 2003/1057* (2013.01)

(58) Field of Classification Search
   CPC ............. B22F 3/1055; B22F 2003/156; B22F 2003/1057; B29C 67/0077; B29C 67/0085; B29C 67/0088
   USPC .................. 425/135, 174.4, 375; 219/121.76, 219/121.77
   See application file for complete search history.

(56) References Cited

U.S. PATENT DOCUMENTS

| 5,135,695 | A   | * | 8/1992  | Marcus ................. 425/174.4 X |
| 5,536,467 | A   |   | 7/1996  | Reichle et al.                       |
| 5,753,171 | A   | * | 5/1998  | Serbin et al. .......... 425/174.4 X |
| 6,184,490 | B1  | * | 2/2001  | Schweizer ............... 219/121.77 |
| 2004/0046287 | A1 |  | 3/2004  | Andino et al.                        |
| 2004/0197493 | A1 | * | 10/2004 | Renn et al. .................... 427/596 |
| 2009/0095214 | A1 | * | 4/2009  | Whitfield ..................... 118/50.1 |
| 2011/0259862 | A1 | * | 10/2011 | Scott et al. ............... 219/121.73 |

FOREIGN PATENT DOCUMENTS

| JP | 61-116321    | 6/1986 |
| JP | 3-193434     | 8/1991 |
| JP | 2009006509 A | 1/2009 |

OTHER PUBLICATIONS

Great Britain Search Report, Dated Nov. 18, 2014, Cited in GB1305018.2.

* cited by examiner

*Primary Examiner* — Leo B Tentoni
(74) *Attorney, Agent, or Firm* — Volentine & Whitt, PLLC

(57) ABSTRACT

Apparatus is for additive layer manufacturing of an article from a material which can be rendered solid locally by application of a focused beam of laser radiation at a planar focal plane. The apparatus includes at least two laser beams, respective scanners for each laser beam for scanning the respective laser beams over a planar field, and a support movable stepwise to allow successive manufacturing layer cycles and for supporting material within the field. The entire planar field is common to each scanner and at least one scanner is tilted with respect to the planar field, and the at least one scanner is provided with a lens arranged to generate a focal plane tilted with respect to that scanner.

19 Claims, 4 Drawing Sheets

APPARATUS FOR ADDITIVE LAYER MANUFACTURING OF AN ARTICLE

FIELD OF THE INVENTION

This invention relates to apparatus and methods for additive layer manufacturing using a focused beam of laser energy selectively directed to a planar focal plane adjacent a layer of powder or liquid to carry out a transformation where it strikes—such as a photo polymerisation, sintering or melting of powders thereby building a three dimensional part layer by layer as planar slices.

BACKGROUND TO THE INVENTION

The layer of powder or liquid is created by the stepwise sinking of the three dimensional part being built into a liquid vat or powder bed thereby presenting a new layer of untransformed material at the surface and retaining a planar focal plane for the laser at or near that surface. The application of material is distinct from the application of laser energy and the process is characterised in that the laser energy cannot address any layer lower or higher than the current layer in a manufacturing cycle. This is in distinction from methods that direct material into an energy beam and/or have multi-axis movement and can build or repair individual articles in multiple planes.

The absence of standardised nomenclature makes naming both this field and the alternatives difficult; however within the broad field of additive manufacturing this field is generally known as 'powder bed additive manufacturing' and its distinctions are well understood—there is a planar field on which material is applied generally and then separately selectively processed.

Alternative additive manufacturing methods outside this field generally apply the material selectively—typically adjacent the energy that will convert them to a solid and may be multi-axis. Examples are robot welders, Optomec LENS, Trumpf (5 axes) Laser Metal Deposition, Fraunhofer ILT Varioclad and other commercial systems of similar concept that apply material locally and on multiple axes, and adaptions of hot melt glue gun and inkjet print head concepts that are mechanically scanned across a flat bed to locally apply material on a single axis.

In the process of interest, the article is constructed layer by layer using photo polymerisation, sintering or melting locally to solidify material locally within the layer to form that part of the article which lies within that layer. This process takes place at the surface of a bed or vat of powder or liquid where there is a fixed focal plane of energy at or near that surface and the part being built is layer by layer lowered to present successive layers of unprocessed powder or liquid at the surface for selective solidification. Typically, and most conveniently, the solidification is induced by a scanned laser beam.

The laser beam is preferably scanned using mirrors to achieve a higher speed than can be achieved by mechanical scanning of the laser or material support.

The use of small spot size (to provide sufficient power density to melt metal powder and provide fine detail) is then achievable because the scanning is sufficiently fast. The present state of the art laser beams have a beam quality factor of almost $M^2=1$.

For a laser melting of metal elements or alloys, typically an Ytterbium doped fibre laser of 200 watts power and beam quality of $M^2<1.05$ is used with a spot size of about 70 microns at the focal plane. The laser is directed using typical laser scan speeds of 1 m/sec to 2 m/sec (up to 7 m/sec as a selectable) through an F-theta lens towards a fixed focal plane at (or near) the layer of the part to be built.

Processes with layer thickness of 20 microns and a mean powder particle size of about 40 microns are known to produce high quality parts in steels, nickel alloys and cobalt chrome with mechanical properties similar to forged or cast and processes are in development for many other metal elements and alloys such as aluminium, titanium and gold alloys.

Although there are technically successful processes, these processes are inherently slow; they use a single laser spot to build each three dimensional part. There is now a demand for faster and cheaper processes and a scalable machine where parts can be built more quickly but without a loss of surface finish, accuracy and material quality.

In a metal powder process the build quality (including surface finish, lack of voids or cracks, crystallography and mechanical properties) is a function of power density, laser spot shape and size, layer thickness and many other process characteristics such as powder grain shape and size.

Increasing process speed cannot be achieved simply by increasing power and/or scan speed; all other parameters remaining the same and achieve the same build quality. A change in power density at the very least changes the process and above a certain energy level causes vapourisation of at least some of the metals in the alloy of the powder, rather than only melting the powder. On the other hand, if scan speed is increased, even with additional power, not enough time may be allowed for the laser energy to be absorbed and melt the powder; that is to say the dwell time is too short.

The parameters affecting these matters are set out in Industrial Application of Lasers by John F. Ready (ISBN0-12-583961-8) and in particular illustrated in FIG. 12-13, which are shown on page 333 of the second edition. This figure plots the regimes of laser power density and pulse durations suitable for material processing applications. It is demonstrated that a combination of increased power density and dwell time can rapidly lead to surface vapourisation and identifies an area in which the desirable small melted depth is achieved. This is located at a pulse duration of around $10^{-4}$ seconds at powers between $10^5$ to $10^6$ W/cm$^2$. The pulse duration of this diagram is directly related to laser scan speeds in the process of this invention.

It therefore follows that it is necessary to keep the power density the same with a higher power laser, which means that at the focal plane a larger spot size is required and possibly thicker layers. The latter parameter is not particularly helpful because the laser energy is absorbed at the surface of the material and not in the bulk (as an electron beam is), however the powder bed may be approximately 50% dense so some laser energy penetrates and is reflected to a little beyond the top surface. Inevitably larger laser spot sizes will reduce the geometric precision of the parts to be made and the same is true for thicker layers.

Changing the power/spot size relationship and layer thickness also effectively means that a new process is being used. In industries, such as the aircraft industry, where parts are subjected to demanding certification requirements, such a change can mean that the whole certification process may have to be redone, which could outweigh any cost benefits achieved by the higher power process.

There is, therefore, a need for an additive layer manufacturing apparatus and process which can achieve higher manufacturing speeds, in a manner which does not just utilize increased power at a single laser spot and does not sacrifice build quality.

SUMMARY OF INVENTION

From one aspect the invention consists in apparatus for additive layer manufacturing of an article from a material which can be rendered solid locally by the application of a focus beam of laser radiation including:

(a) at least two laser beams;
(b) a respective scanner for each laser beam for scanning the respective laser beams over a planar field;
(c) a support moveable step-wise to allow successive manufacturing layer cycles and for supporting material within the field;

wherein the entire planar field is common to each scanner and at least one scanner is tilted with respect to the planar field and said at least one scanner is provided with a lens arranged to generate a focal plane tilted with respect to that scanner.

In at least some embodiments, each scanner may be for providing a beam which is not centred normal to the planar field.

Advantageously, the applicants have recognised that the provision of tilted scanners in combination with a lens to tilt the focal plane (such that the focal plane is, for example, substantially similar to that which would be provided by a non-tilted scanner) helps to enable the use of a plurality of scanners while minimising any impact on the resultant build quality. Several reasons have been identified for this advantage. Firstly, conventional high build quality additive layer manufacture systems generally require relatively large scanner and lens assemblies in order to provide a small and precise spot size at the focal plane (which may typically require a spot size of about 70 microns). The size of the scanner and/or associated lens assembly may, for example, be of approximately the same order as the planar field of the apparatus. Further, it is desirable to keep the distance between the lens and planar field to a minimum since increased distance (for example as might be necessary to enable two co-planar scanners to be positioned side-by-side over the planar field) generally leads to a decreased accuracy of spot placement and/or spot size. The applicants have recognised that the inclusion of a lens to tilt the focal plane of the beam from the tilted scanner is particularly beneficial when a relatively high build quality is desired since the depth of focus is proportional to the square of focal spot size (thus a greater build quality necessitates a significantly narrower the depth of focus).

Each scanner may be tilted with respect to the planar field. Each scanner which is tilted may be provided with a lens arranged to generate a focal plane tilted with respect to its respective scanner. The scanners may, for example be oppositely tilted. For example two opposing tilted scanners may be provided each being inwardly tilted at their outer edges with respect to the planar field.

The cross-section of the laser beams at the planar field may be the same and/or the energy of the laser beams may be the same.

A control may be provided for controlling the scanner such that in a single layer, the respective beams do not visit the same point in the field simultaneously. The control may further be for varying the beam cross-section between steps.

At least one laser beam may have a variable focus facility. Additionally or alternatively an F-theta lens may be placed after a scanner. Each F-theta lens may be tilted so as to be aligned with its respective scanner. This may be advantageous since the size of the F-theta lens may be a physical constraint in the arrangement of the apparatus. The, or each, F-theta lens may comprise the lens arranged to generate a focal plane tilted with respect to that scanner. It will be appreciated that an F-theta lens may, typically, comprise a plurality of individual lens elements in a single unit. As such the F-theta lens may either include a dedicated lens element for generating a tilted focal plane or alternatively may include a lens element which is modified to generate a tilted focal plane (i.e. in addition to its existing function in the f-theta lens).

An F-theta lens generates a planar focal plane for the spherical focal surface of the scanner mirror as it swings the laser beam through an angle theta. It also renders the laser spot less elliptical at the edges of the field. Conventionally F-theta lens generate a non-tilted focal plane but it may be possible to design a suitable F-theta lens that has a tilted focal plane and thus when used with a titled scanner produce a focal plane in accord with another focal plane from another scanner.

Such a F-theta lens may not exist, and more readily a commercially available variable focus may be applied to the laser beam incoming to the scanner thereby the focus is altered to produce a tilted planar focal plane and a conventional F-theta lens placed after the scanner removes the spherical abnormality inherent in a mirror based scanner. Thus, the (or each) lens arranged to provide tilted focal plane may be a variable focus.

From a further aspect, the invention may include a method of additive layer manufacturing an article from a material which can be rendered solid locally by the application of a focused beam of laser radiation including: providing at least two laser beams; providing a scanner for each laser beam for scanning each laser beam over an entire planar field; providing a support moveable step-wise to support material within the field; scanning the laser beam simultaneously but separately over the field to render solid the desired portions of material contained in the field to perform a manufacturing cycle and stepping the support after each cycle, wherein at least one scanner is tilted with respect to the common planar field and the method further comprises the step of tilting the focal plane of the laser beam from the said at least one scanner The respective laser beams preferably remain separated and never visit the same point in the field at the same time in a single manufacturing cycle, because to do so might reduce the efficacy of the invention, being the duplication of laser work within a field without changing the work done at any point on that field. If laser beams were about to arrive at the same point then one could be switched off or their respective power could be adjusted so that the powers sum to the desired process power. The alternative of summing two lasers at under power to allow simultaneous location would be less desirable same benefits of the invention would be lost.

The laser spot size, cross-section and/or energy at the focal plane from each laser beam may be the same at the planar field and these characteristics may be varied between layers or across a layer.

One or each beam may be varied in focus prior to scanning. The focus may be performed in conjunction with the step of the step of tilting the focal plane of the laser beam from the said at least one scanner. Additionally or alternatively at least one-off normal beam may be further focused by an F-theta lens after scanning. The F-theta lens may be arranged to perform the step of tilting the focal plane of the laser beam from the said at least one scanner.

BRIEF DESCRIPTION OF THE FIGURES

The invention can be performed in various ways and specific embodiments will now be described, by way of example, with reference to the accompanying drawings, in which.

DESCRIPTION OF AN EMBODIMENT

Figure 1:
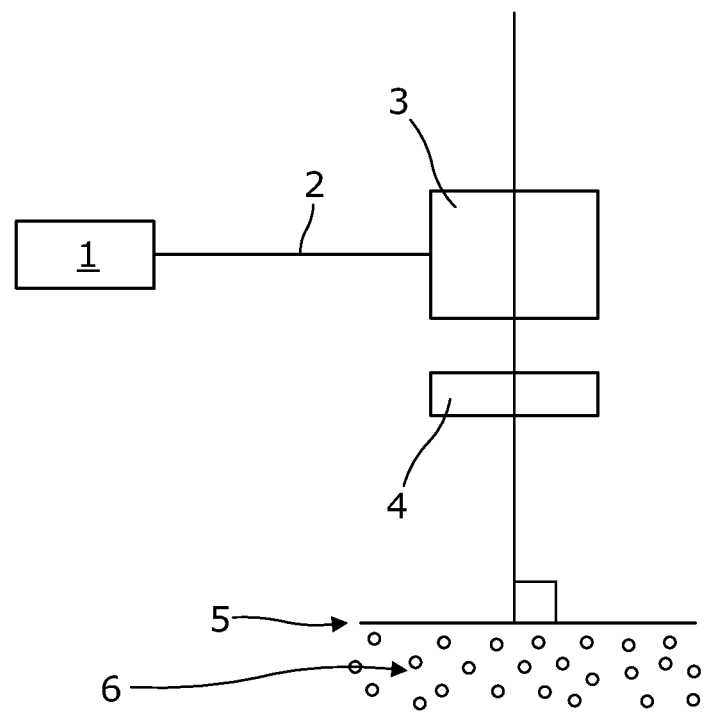
FIG. 1 is a schematic view of a basic prior art single beam additive layer manufacturing apparatus.

Turning to FIG. 1, (prior art) the standard known system has a laser 1 that transmits light via a conductor (e.g. optical fibre 2) to a scanner 3, which scans a beam through an F-theta lens 4, which is mounted perpendicular to a focal plane 5 at or near the surface of a powder or fluid bed 6. A typical useful depth of focus of a fixed focus laser with a Gaussian beam profile is approximately +/−2 mm. Typically the useful focal plane is 250×250 mm square and a scanner 3 is located approximately 500 mm from the local plane. The laser spot shape and size is substantially but not exactly constant across the focal plane. As the laser beam moves away from the centre point its shape and size changes becoming oval and expanding in size, thereby reducing power density. This variation determines the size of the useful focal plane—it's an area of process acceptable variation.

Figure 2:
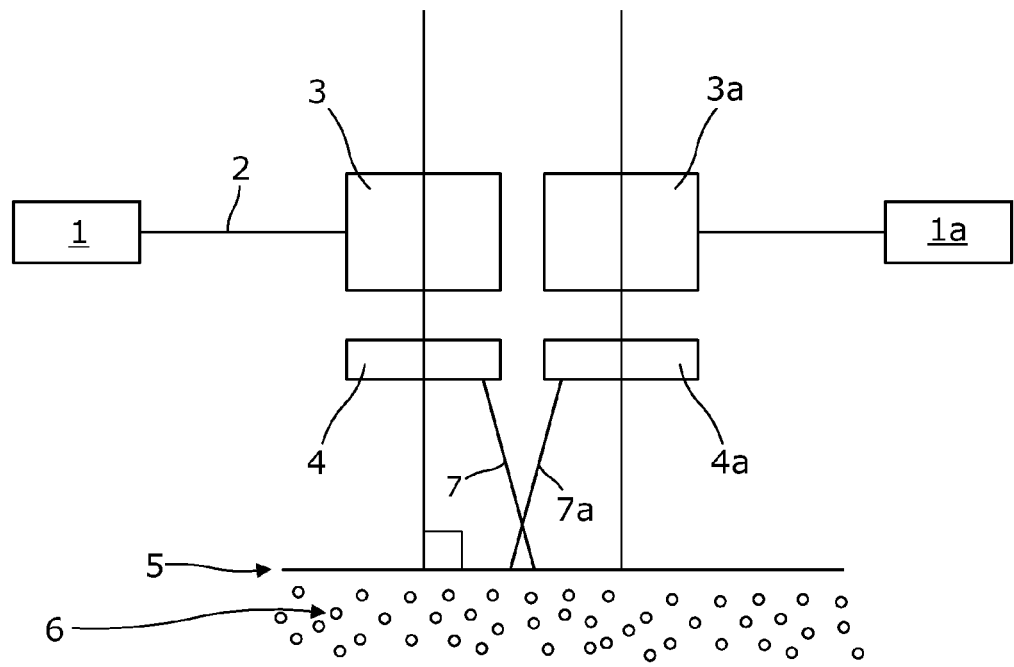
FIG. 2 is a similar schematic diagram of a known additive-layer manufacturing apparatus in which separate beams are used to form separate articles or different sections of a single article.

A development of this is show in FIG. 2 (prior art), where two such arrangements are mounted side by side, with the elements of the second being designated by the subscript a, the central optical axes of the scanners 3, 3a being shown by solid lines as perpendicular to the focal plane 5, and the beams 7, 7a propagating from the F-theta lenses 4, 4a, respectively, each shown at a respective end of the scans executed by the scanners 3, 3a. This enables a larger focal plane 5 to be addressed so that multiple parts can be made simultaneously, or different sections of a single part can be made simultaneously and contiguously by an overlapping at the area generally indicated at x. Note that this is possible in the powder bed machine because there is a separation of the application of laser energy to solidify powder and the dispensing of that powder. Lasers can visit the same spot multiple times, the first time melting the power and on subsequent visits melting/remelting the solidified powder without undesirable effect. Thereby an overlapping of elements of a single part being addressed by multiple lasers is possible. This arrangement enables the manufacture of a large single part, or indeed the simultaneous manufacture of individual parts side by side but each laser setup is the subject of the limitations mentioned above and a large bed 6 is required.

A further multi-beam arrangement is shown in U.S. Pat. No. 5,508,489. This seeks to apply an unfocused laser beam over the whole of the focal plane so as to preheat the powder and reduce the energy needed to be delivered by the scanned beam. This too does not address the issues raised.

Figure 3:
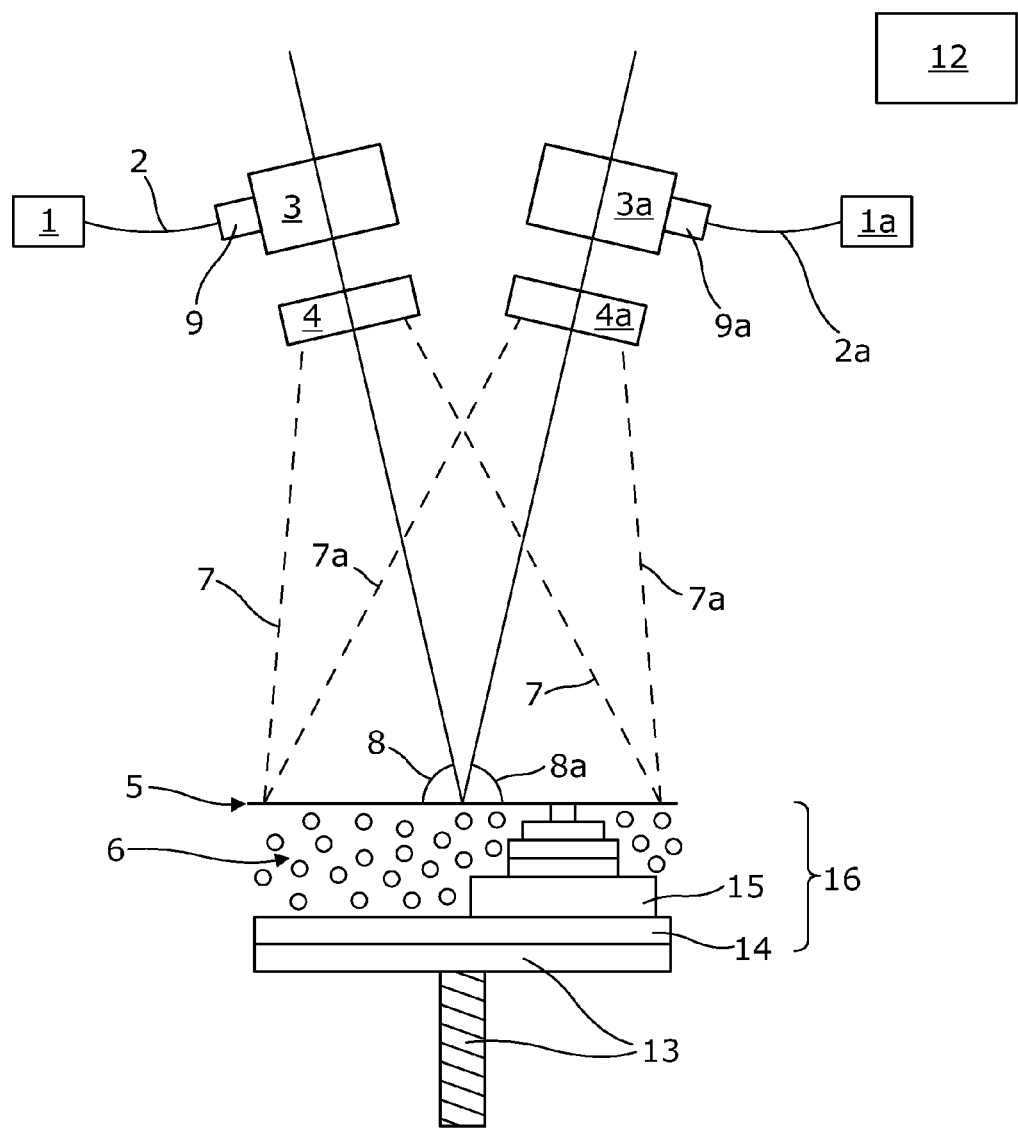
FIG. 3 is a schematic diagram of one embodiment of the invention.

Turning to FIG. 3, the Applicants have appreciated that by positioning the scanners 3, 3a side-by-side with at least one of scanners 3, 3a being tilted relative to an axis perpendicular to the top surface of the powder bed 6 such that at least one of the beams 7, 7a is not normal to the (common) planar field across which the beams 7, 7a are scanned as shown by the dashed lines in the figure, then it is possible to achieve an arrangement whereby the two focused laser beams can each scan over the same field so that any part of any article that lies in the layer being processed at the time can be made by either spot. This means that, with suitable programming to ensure the laser spots do not visit the same location in any one layer simultaneously, the article can be made within the same power regime and with the same spot size as in FIG. 1 or 2 but at something approaching twice the speed.

Specifically, the arrangement illustrated includes two identical but oppositely tilted laser systems respectably comprising a laser 1, 1a, optical fibres 2, 2a, scanners 3, 3a and F-theta lenses 4, 4a. The scanners and theta lenses are mounted at respective tilts in relation to the focal plane 5, the angles of the tilts being 8, 8a. Each system has a variable focus unit 9, 9a for varying the focus of the laser beam prior to its introduction into the scanner 3, 3a.

The apparatus is controlled by a control 12, which can control, amongst other things, the lasers 1, 1a, variable focus units 9, 9a and scanners 3, 3a, as well as the control of the elevator 13, which will be described below.

Whilst multiple lasers are indicated, it is known in the art that a single large laser can supply multiple beams via a beam splitter each of which can be delivered to a scanner via a fibre 2.

Using +/−20 mm of focus variation will allow an angle 8, 8a of approximately 80° with respect to a typical 250/250 mm focal plane area and a nominal (on axis) focal distance of approximately 500 mm. (The degree of tilt can be described as 10 degrees, being the conventional 90 degrees, less the angle 8,8a). It is not necessary for the angles 8, 8a to be identical. Indeed, the angle 8 may be 90° in certain embodiments. There may be more than two lasers with independent optical systems.

The variable focus units 9, 9a provide a convenient way of varying the focus distance for the laser beams onto a focal plane 5 which, due to the tilt, is now at different distances from the F-theta lens across its plan, as will be described in connection with FIG. 4. Alternatively that function may be achieved by use of a modified F-theta lens 4 located after the scanners 3, 3a. Such an F-theta lens would not only convert the spherical focal surface native of the scanner to a flat plane by also a tilted flat plane.

The powder bed 6 is mounted on an elevator 13 consisting of an upper part that moves perpendicularly with respect to the laser focal plane (and surface of the powder bed). Upon this elevator is mounted a demountable substrate 14 onto which a part 16 is built layer by layer as indicated at 15. Typically these layers are 20 microns thick. The laser spot size projected onto the focal plane is typically about 70 microns in diameter, however—as is known in the art, the laser spot size may be increased in size, within the range of sizes giving a powder density sufficient to achieve the desired process, to allow faster building of bulk parts which do not include fine features. It is possible to have one of the laser spots always with a larger spot size than the other so that one laser always builds the bulk portions of the article, whilst the other dealt with the fine features but this is not necessary for the invention.

Impact of the laser beam upon the metal alloy or polymer powder will melt or sinter it. Alternatively, photo polymerisation of a liquid may be achieved or indeed other processes may be used to convert a powder or liquid into a solid part thereby creating the article 16 from layers 14, which each represent a slice of a 3-D article. These slices are built up by summing the layers created in one plane by means of the elevator 13 being stepped downwards between the layers, as is well understood in the field of powder bed additive layer manufacturing.

Figure 4:
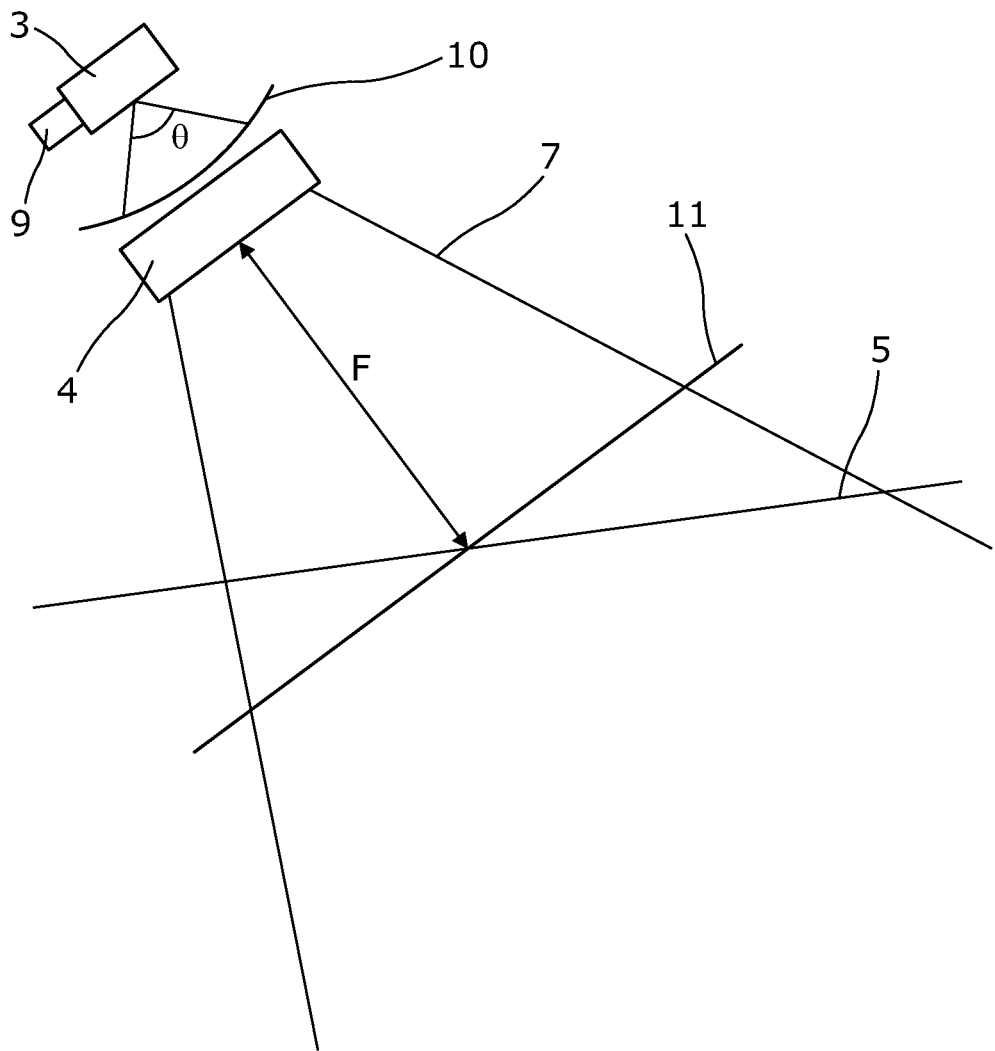
FIG. 4 is a schematic diagram of the tilt in the plane of focus necessary to bring a constant plane of focus from the apparatus of FIG. 3.

In FIG. 4, the treatment of the focal point is illustrated. Here the natural focal point 10 of the scanner 3 is a sphere a constant distance from output mirror of the scanner 3 as the laser beam is deflected through an angle $\Theta$. The F-theta lens creates a fixed flat focal plane at 11 at a constant distance F. By using the variable focus unit 9, this now tilted focal plane can be compensated for to bring a focus at the desired focal plane 5 which lies adjacent the top of the bed 6. This arrangement is a particularly neat way of achieving the requirement of the invention. The control unit 12 adjusting the focus of the laser by means of vary focus unit 9 according to the direction the laser beam has been directed. Alternatively or in addition a modified F-theta lens could be used that instead of having the usual focal plane 11 has a focal plane 5, but the inventor is not aware of their commercial existence.

It should be noted that any arrangement of side by side fields as illustrated at FIG. 2 (prior art) can have the speed of its operation increased by the invention illustrated at FIG. 3—the application of second and further laser beams across the same field(s). The invention is not an alternative to the prior art, it is an improvement upon it.

As has been mentioned above, the apparatus is under the control of the computer 12 so that the multiple laser spots are applied on a layer by layer basis to all parts of the focal plane where build is to take place thus significantly increasing the speed and manufacture. The computer is provided with sliced 3-D files (such as a .sli file) and the program works out, for each layer, the best application for the respective laser beams. It is obviously desirable to have each laser beam actively operating for substantially equal periods during the manufacture of any existing layer because the manufacturing time for any existing layer will be determined by the laser beam which is operative longest.

The invention claimed is:

1. Apparatus for additive layer manufacturing of an article from a material rendered solid when impinged by a focussed beam of laser radiation, including:
    (a) a source of at least two laser beams;
    (b) scanners having optical axes about which laser beams are scanned, respectively,
    at least one of the scanners being tilted with respect to a planar field such that the optical axis of the at least one scanner subtends an acute angle with the planar field, and
    the scanners being oriented relative to one another such that the laser beams are each moved by the scanners, respectively, across the planar field whereby the planar field is common to the scanners, and
    (c) a support dedicated to support the material within the planar field and movable step wise to allow successive manufacturing layer cycles; and
    (d) a respective lens operatively associated with each said at least one scanner and by which the focal plane of laser light transmitted from the at least one scanner towards the planar field is tilted with respect to a plane perpendicular to the optical axis of that scanner.

2. Apparatus as claimed claim 1 wherein each scanner is tilted such that the optical axis of each of the scanners subtends an acute angle with the planar field and the optical system is operatively associated with each scanner such that the focal plane of laser light transmitted from each of the respective scanners is each tilted with respect to the optical axis of the respective scanner.

3. Apparatus as claimed in claim 2, wherein the scanners comprise two scanners oppositely tilted relative to one another such the optical axes of the two scanners are located on opposite sides of an axis perpendicular to the planar field.

4. Apparatus as claimed in claim 1, further comprising a respective F-theta lens aligned with the optical axis of each said scanner.

5. Apparatus as claimed in claim 1, wherein each respective said lens is an F-theta lens.

6. Apparatus as claimed in claimed in claim 1, wherein each said lens is a lens having a variable focus.

7. Apparatus as claimed in claim 1 wherein each said lens is an optical element whose function in the apparatus is dedicated to the providing of the focal plane tilted with respect to the optical axis of the scanner with which it is operatively associated.

8. Apparatus as claimed in claim 1 wherein the optical system is operative to vary the focus of the light of at least one laser beam transmitted towards the planar field.

9. Apparatus as claimed in claim 1, optically configured such that the cross-section of the laser beams at the planar field is the same and/or the energy of the laser beams is the same.

10. Apparatus as claimed in claim 9, further including a control for controlling the scanners such that in a single layer the respective beams do not visit the same point in the planar field simultaneously.

11. Apparatus as claimed in claim 10, wherein the control is further for varying the beam cross-section between steps.

12. Apparatus as claimed in claim 1, wherein the apparatus is a powder bed additive layer apparatus.

13. Apparatus for additive layer manufacturing of an article from a material rendered solid locally by application of a focussed beam of laser radiation at a top surface of a powder bed comprising the material, the apparatus including:
    a source of at least two laser beams;
    scanners over the planar powder bed and operable to scan the laser beams, respectively, across the top surface of the powder bed;
    a support dedicated to support the powder bed and movable step-wise to allow for successive manufacturing layer cycles to be executed in manufacturing at least one article from the powder bed,
    wherein at least one of the scanners is tilted off-axis relative to a normal axis perpendicular to the top surface of the powder bed such that the at least one scanner outputs beams which propagate along axes that are non-parallel to said normal axis; and
    controllable optics comprising a lens associated with the at least one scanner and configured to provide a compensated focal plane substantially parallel to the top surface of the powder bed and which compensated focal plane subtends acute angles with the axes, respectively, along which the beams output by the at least one scanner propagate.

14. Additive layer manufacturing apparatus including:
    an elevator having a horizontal support surface; and
    a system of optics comprising:
    a source of at least two laser beams, and
    first and second scanners disposed above the support surface of the elevator, the scanners being optically coupled to the source of the at least two laser beams so as to receive the laser beams, respectively, from the source, each of the scanners having a central optical axis, and the scanners being oriented relative to one another such that a respective horizontal field across which laser beams output by one of the scanners is scanned overlaps a respective horizontal field over which laser beams output by another of the scanners is scanned, whereby the scanners have a common planar exposure field, and
    wherein one of the scanners is tilted relative to the vertical such that the central optical axis thereof is inclined and a scanning direction in which the laser beam received by the scanner is moved is non-parallel to the horizontal fields, and the system of optics is configured to have focal planes for light output from each of the scanners substantially parallel to the horizontal fields and disposed above the support surface when the elevator is in a position at which a cycle of an additive layer manufacturing process is being carried out by the apparatus.

15. The apparatus as claimed in claim 14, wherein the system of optics comprises a lens having a variable focus optically coupling the source the at least two laser beams to said one of the scanners.

16. The apparatus as claimed in claim 14, wherein the system of optics comprises F-theta lenses optically coupled to the scanners, respectively, at output sides of the scanners.

17. The apparatus as claimed in claim 14, wherein both of the first and second scanners are tilted relative to the vertical such that the central optical axes of the scanners are inclined and respective scanning directions in which the laser beams received by scanners are moved are each non-parallel to the horizontal fields.

18. The apparatus as claimed in claim 14, wherein the source comprises two discrete lasers optically coupled to the scanners, respectively.

19. Apparatus as claimed in claim 14, wherein the apparatus is a powder bed additive layer apparatus.

* * * * *